(12) United States Patent
Wang et al.

(10) Patent No.: US 8,443,032 B2
(45) Date of Patent: May 14, 2013

(54) MULTIPLICATION CIRCUIT AND DE/ENCRYPTION CIRCUIT UTILIZING THE SAME

(75) Inventors: Chen Hsing Wang, Hsinchu (TW); Chieh Lin Chuang, Pingtung County (TW); Cheng Wen Wu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 1448 days.

(21) Appl. No.: 12/057,266

(22) Filed: Mar. 27, 2008

(65) Prior Publication Data

US 2009/0245505 A1    Oct. 1, 2009

(51) Int. Cl.
*G06F 7/52* (2006.01)

(52) U.S. Cl.
USPC ........... 708/620; 708/208; 708/501; 708/520; 380/28

(58) Field of Classification Search ........................ None
See application file for complete search history.

(56) References Cited

U.S. PATENT DOCUMENTS

| | | | |
|---|---|---|---|
| 6,055,556 A * | 4/2000 | Barak et al. | 708/607 |
| 2007/0014416 A1 | 1/2007 | Rivera et al. | |
| 2009/0220163 A1* | 9/2009 | Wu et al. | 382/249 |

FOREIGN PATENT DOCUMENTS

| | | |
|---|---|---|
| EP | 1241553 | 3/2001 |
| TW | 247976 | 8/1992 |

OTHER PUBLICATIONS

Taiwanese Office Action dated Oct. 14, 2011 for 097126015, which is a corresponding Taiwanese application, that cites TW369781, US2007/014416, EP1241553, and Cheng-Wen Wu et al., A High-Speed Word-Based RSA Crypto-Processor, Department of Electrical Engineering National Tsing Hua University, 2002.

Cheng-Wen Wu et al., A High-Speed Word-Based RSA Crypto-Processor, Department of Electrical Engineering National Tsing Hua University, 2002.

* cited by examiner

*Primary Examiner* — Michael D Yaary
(74) *Attorney, Agent, or Firm* — WPAT, P.C.; Anthony King (57) ABSTRACT

A multiplication circuit generates a product of a matrix and a first scalar when in matrix mode and a product of a second scalar and a third scalar when in scalar mode. The multiplication circuit comprises a sub-product generator, an accumulator and an adder. The adder is configured to sum outputs of the accumulator to generate the product of the first scalar second scalar and the third scalar when in scalar mode. The sub-product generator generates sub-products of the matrix and the first scalar when in matrix mode and sub-products of the second scalar and the third scalar when in scalar mode. The accumulator is configured to generate the product of the matrix and the first scalar by providing save of the multiplication operation of the outputs from the sub-product generator.

10 Claims, 9 Drawing Sheets

$$B' = \begin{bmatrix} b_7' \\ b_6' \\ b_5' \\ b_4' \\ b_3' \\ b_2' \\ b_1' \\ b_0' \end{bmatrix} = M \times B = \begin{bmatrix} m_{00} & m_{01} & \cdots\cdots & m_{07} \\ m_{10} & m_{11} & \cdots\cdots & m_{17} \\ m_{20} & & & \\ \vdots & & \ddots & \\ m_{70} & & & m_{77} \end{bmatrix} \begin{bmatrix} b_7 \\ b_6 \\ b_5 \\ b_4 \\ b_3 \\ b_2 \\ b_1 \\ b_0 \end{bmatrix}$$

FIG. 1

$$D \times E = F$$

$$
\begin{array}{r}
d_7\ d_6\ d_5\ d_4\ d_3\ d_2\ d_1\ d_0 \\
\times)\ \ e_7\ e_6\ e_5\ e_4\ e_3\ e_2\ e_1\ e_0 \\
\hline
e_0\ (d_7\ d_6\ d_5\ d_4\ d_3\ d_2\ d_1\ d_0) \\
e_1\ (d_7\ d_6\ d_5\ d_4\ d_3\ d_2\ d_1\ d_0) \\
e_2\ (d_7\ d_6\ d_5\ d_4\ d_3\ d_2\ d_1\ d_0) \\
e_3\ (d_7\ d_6\ d_5\ d_4\ d_3\ d_2\ d_1\ d_0) \\
e_4\ (d_7\ d_6\ d_5\ d_4\ d_3\ d_2\ d_1\ d_0) \\
e_5\ (d_7\ d_6\ d_5\ d_4\ d_3\ d_2\ d_1\ d_0) \\
e_6\ (d_7\ d_6\ d_5\ d_4\ d_3\ d_2\ d_1\ d_0) \\
+)\ e_7\ (d_7\ d_6\ d_5\ d_4\ d_3\ d_2\ d_1\ d_0) \\
\hline
f_{15}\ f_{14}\ f_{13}\ f_{12}\ f_{11}\ f_{10}\ f_9\ f_8\ f_7\ f_6\ f_5\ f_4\ f_3\ f_2\ f_1\ f_0
\end{array}
$$

| S_P3 | S | | S_P2 |
|---|---|---|---|

MULTIPLICATION CIRCUIT AND DE/ENCRYPTION CIRCUIT UTILIZING THE SAME

BACKGROUND OF THE INVENTION (A) Field of the Invention

The present invention relates to an arithmetic circuit, and more particularly, to an arithmetic circuit for matrix and scalar multiplication.

(B) Description of the Related Art

As usage of the Internet continues to grow, the demand for security has become the priority issue in network communication. The realizations of information security algorithms can be roughly categorized into two types:

software-based and hardware-based implementations. The software-based implementation utilizes a processing unit to execute the calculation of the cryptographic algorithms. However, when traffic on the network increases, the processing unit will perform poorly as the capacity thereof will mainly occupied by instructions related to the network packets. The performance downgrade is much alleviated in hardware-based implementation, since there is a hardware circuit dedicated to the calculation of the cryptographic algorithms. Therefore, in high rate network communication, most systems are implemented hardware-wise.

Cryptography can be categorized into two types based on the key used in the algorithm: symmetric systems and asymmetric systems. Symmetric systems use the same key during the encryption and decryption process, while asymmetric systems use different ones. Advanced Encryption Standard (AES), which is a new symmetric system announced by the National Institute of Standards and Technology in 2001, requires matrix multiplications during the encryption and decryption process. Meanwhile, Elliptic Curve Cryptography (ECC) and Rivest-Shamir-Adelman (RSA) algorithms, both asymmetric systems, require scalar multiplications during the encryption and decryption process. These systems are used widely in cryptography systems, so an integrated design that can support AES RSA, and ECC is necessary. Therefore, it is necessary to design a multiplication circuit supporting both matrix and scalar multiplications.

SUMMARY OF THE INVENTION

A multiplication circuit, generating a product of a matrix and a first scalar when in matrix mode and a product of a second scalar and a third scalar when in scalar mode, is described. The multiplication circuit comprises a sub-product generator, an accumulator and an adder. The adder is configured to sum outputs of the accumulator to generate the product of the second scalar and the third scalar when in scalar mode. When the multiplication circuit is in matrix mode, the sub-product generator generates sub-products of the matrix and the first scalar. The sub-products are stacked into a square form and are summed by the accumulator to generate save of the summation to be the product of the matrix and the first scalar. When the multiplication circuit is in scalar mode, the sub-product generator generates sub-products of the second scalar and the third scalar. The sub-products are stacked and shifted into a stair form, and a middle part is extracted to form a square matrix and zeroes pad the empty fields. The accumulator is configured to sum the square matrix to generate save and carry of the summation of the square matrix. Saves and carries of the summation of the remaining parts of the stair form of the sub-products are also generated.

A de/encryption circuit for Advanced Encryption Standard (AES), Rivest-Shamir-Adelman (RSA) and Elliptic Curve Cryptography (ECC) algorithm comprising an arithmetic circuit, a storage module, a controller circuit and a multiplication circuit according to the multiplication circuit described above, is described. The arithmetic circuit generates the round keys for the AES algorithm. The storage module provides the data to be de/encrypted. The multiplication according executes the multiplication operation of the round keys and the data provided by the arithmetic circuit and the storage module and storing the results in the storage module.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
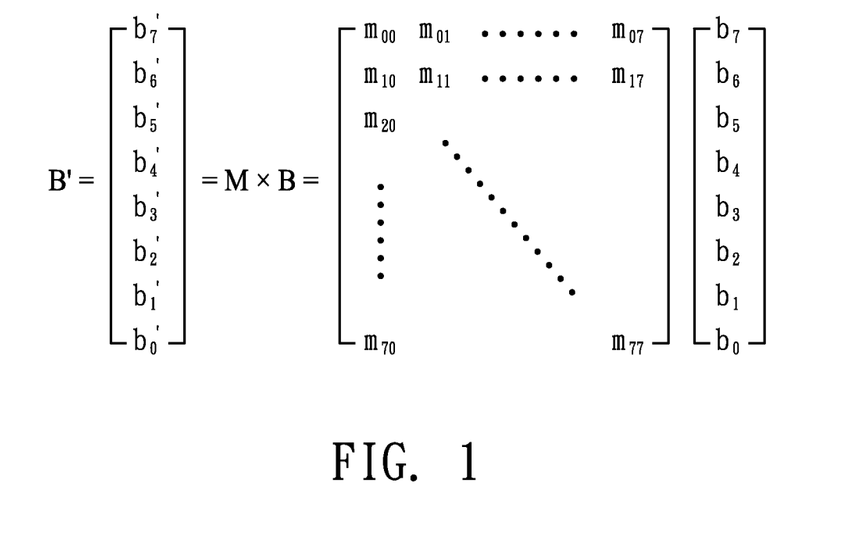
FIG. 1 shows a matrix multiplication of a matrix multiplied by a scalar vector.

FIG. 1 shows a matrix multiplication of a matrix multiplied by a scalar vector. As shown in FIG. 1, M is an eight-by-eight matrix and contains coefficients m00 to m77. B is a scalar vector containing bits $b_0$ to $b_7$. B' is the product containing bits $b_0'$ to $b_7'$. The product B' can be represented as follows:

$$B' = \{b_7', b_6', \ldots, b_0'\}'$$
$$= c_0 b_7 \oplus c_1 b_6 \oplus c_2 b_5 \oplus c_3 b_4 \oplus c_4 b_3 \oplus c_5 b_2 \oplus c_6 b_1 \oplus c_7 b_0,$$

wherein $c_0 b_7 = \{m_{00} b_7, m_{10} b_7, m_{20} b_7, m_{30} b_7, m_{40} b_7, m_{50} b_7, m_{60} b_7, m_{70} b_7\}'$, $c_1 b_6 = \{m_{01} b_6, m_{11} b_6, m_{21} b_6, m_{31} b_6, m_{41} b_6, m_{51} b_6, m_{61} b_6, m_{71} b_6\}'$, $c_2 b_5 = \{m_{02} b_5, m_{12} b_5, m_{22} b_5, m_{32} b_5, m_{42} b_5, m_{52} b_5, m_{62} b_5, m_{72} b_5\}'$, $c_3 b_4 = \{m_{03} b_4, m_{13} b_4, m_{23} b_4, m_{33} b_4, m_{43} b_4, m_{53} b_4, m_{63} b_4, m_{73} b_4\}'$, $c_4 b_3 = \{m_{04} b_3, m_{14} b_3, m_{24} b_3, m_{34} b_3, m_{44} b_3, m_{54} b_3, m_{64} b_3, m_{74} b_3\}'$, $c_5 b_2 = \{m_{05} b_2, m_{15} b_2, m_{25} b_2, m_{35} b_2, m_{45} b_2, m_{55} b_2, m_{65} b_2, m_{75} b_2\}'$, $c_6b_1=\{m_{06}b_1, m_{16}b_1, m_{26}b_1, m_{36}b_1, m_{46}b_1, m_{56}b_1, m_{66}b_1, m_{76}b_1\}'$ and $c_7b_0=\{m_{07}b_0, m_{17}b_0, m_{27}b_0, m_{37}b_0, m_{47}b_0, m_{57}b_0, m_{67}b_0, m_{77}b_0\}'$, wherein $c_0b_7$ to $c_7b_0$ are called the sub-products of the matrix multiplication, and $\oplus$ stands for exclusive-or operation.

Figure 2:
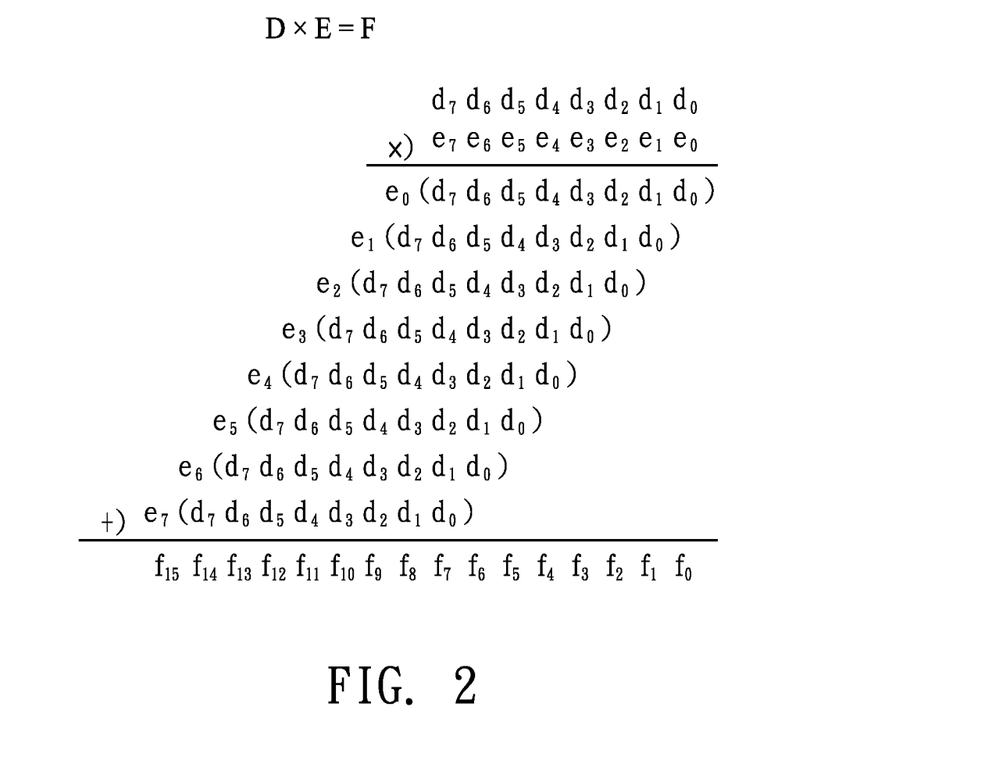
FIG. 2 shows a scalar multiplication of two scalar vectors multiplied together.

FIG. 2 shows a scalar multiplication of two scalar vectors multiplied together. As shown in FIG. 2, D is a scalar vector containing bits $d_0$ to $d_7$, and E is also a scalar vector containing bits $e_0$ to $e_7$. If D and E are respectfully denoted by $D=d_7 2^7+d_6 2^6+\ldots+d_1 2^1+d_0$ and $E=e_7 2^7+e_6 2^6+\ldots+e_1 2^1+e_0$, then the product F can be represented as follows:

$$F = E \times (d_7 2^7 + d_6 2^6 + \ldots + d_1 2^1 + d_0)$$
$$= E \times d_7 2^7 + E \times d_6 2^6 \ldots + E \times d_1 2^1 + E \times d_0,$$

wherein $E \times d_7 2^7$ to $E \times d_0$ are called the sub-products of the scalar multiplication. As shown in FIG. 2, the sub-products are then summed together to obtain the result.

In the present invention the matrix multiplication and the scalar multiplication are integrated together by extracting the similar operations out for the main calculation of the multiplication circuit and executing the remaining operation thereafter. When the multiplication circuit is executing a multiplication operation, the sub-products are first obtained. When the multiplication circuit is in matrix mode, the sub-products are summed together to give the final result. When the multiplication circuit is in scalar mode, on the other hand, the multiplication process is divided into several stages to be integrated with the matrix multiplication operation.

Figure 3:
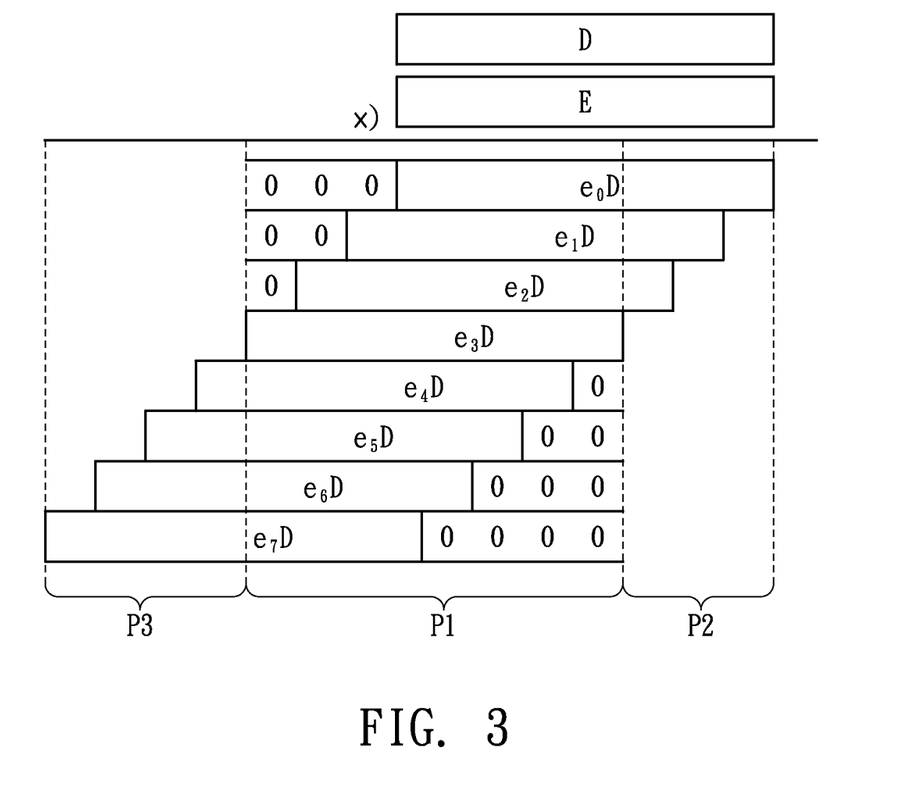
FIG. 3 shows the summation of the sub-products of the scalar multiplication.

As shown in FIG. 3, the summation of the sub-products of the scalar multiplication is separated into three parts. P1 is extracted from the middle part of the stacked sub-products to form a square matrix, wherein zeroes pad the empty fields. P2 is the least significant part of the stacked sub-products. P3 is the most significant part of the stacked sub-products. The matrix P1 is then summed in carry-save sense to give the carry and save of the summation. Since the summation in the matrix multiplication is in fact the exclusive-or operation, the carries do not need to be carried over. Therefore, the save of the summation of P1 is the result requested when the multiplication circuit is in matrix mode. On the other hand, when the multiplication circuit is in scalar mode, further summations are needed. The carry and save of the summation of P3 are summed together with the carries and saves of the summation of P1 and P2 to give the final result.

Figure 4:
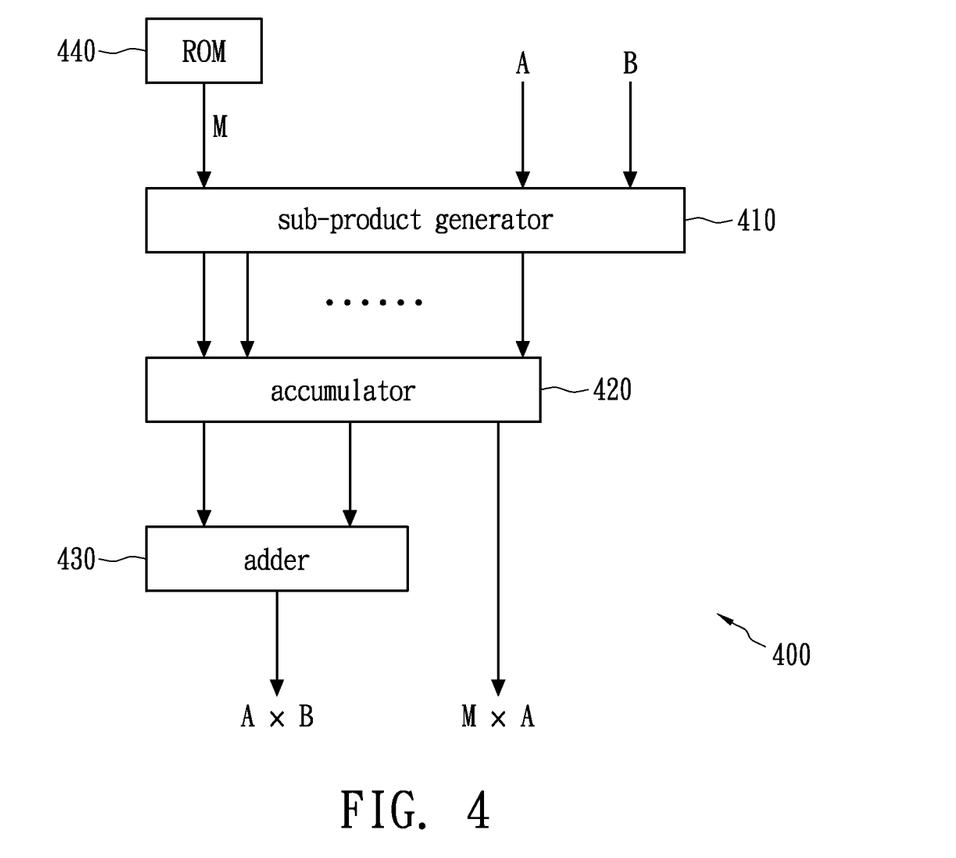
FIG. 4 shows the architecture of one embodiment of the multiplication circuit of the present invention.

FIG. 4 shows the architecture of one embodiment of the multiplication circuit of the present invention. The multiplication circuit 400 supports eight-bit matrix multiplication of a matrix M multiplied by a first scalar A and eight-bit scalar multiplication of the first scalar A multiplied by a second scalar B. The multiplication circuit 400 comprises a sub-product generator 410, an accumulator 420 and an adder 430. The sub-product generator 410 receives the first scalar A, the second scalar B and the coefficients $m_{00}$ to $m_{77}$ of the matrix M.

When the multiplication circuit 400 is in matrix mode, the sub-product generator 410 generates the sub-products of the matrix M and the first scalar A. The accumulator 420 then sums the sub-products to generate the save of the summation to be the product of the matrix multiplication.

When the multiplication circuit 400 is in scalar mode, the sub-product generator 410 generates the sub-products of the first scalar A and the second scalar B. The sub-products are stacked and shifted into a stair form, the middle part P1 is extracted to form a square matrix and zeroes pad the empty fields, as shown in FIG. 3, while the remaining parts are denoted by P2 and P3. The accumulator 420 then sums P1, P2 and P3 to generate the carries and saves. The adder 430 then sums the carries and saves from the accumulator 420 to give the final result. Preferably, the multiplication circuit 400 may further comprise a storage unit 440, such as a read-only memory (ROM), and the accumulator 420 is carry-save accumulator, such as a Wallace Tree accumulator.

Figure 5:
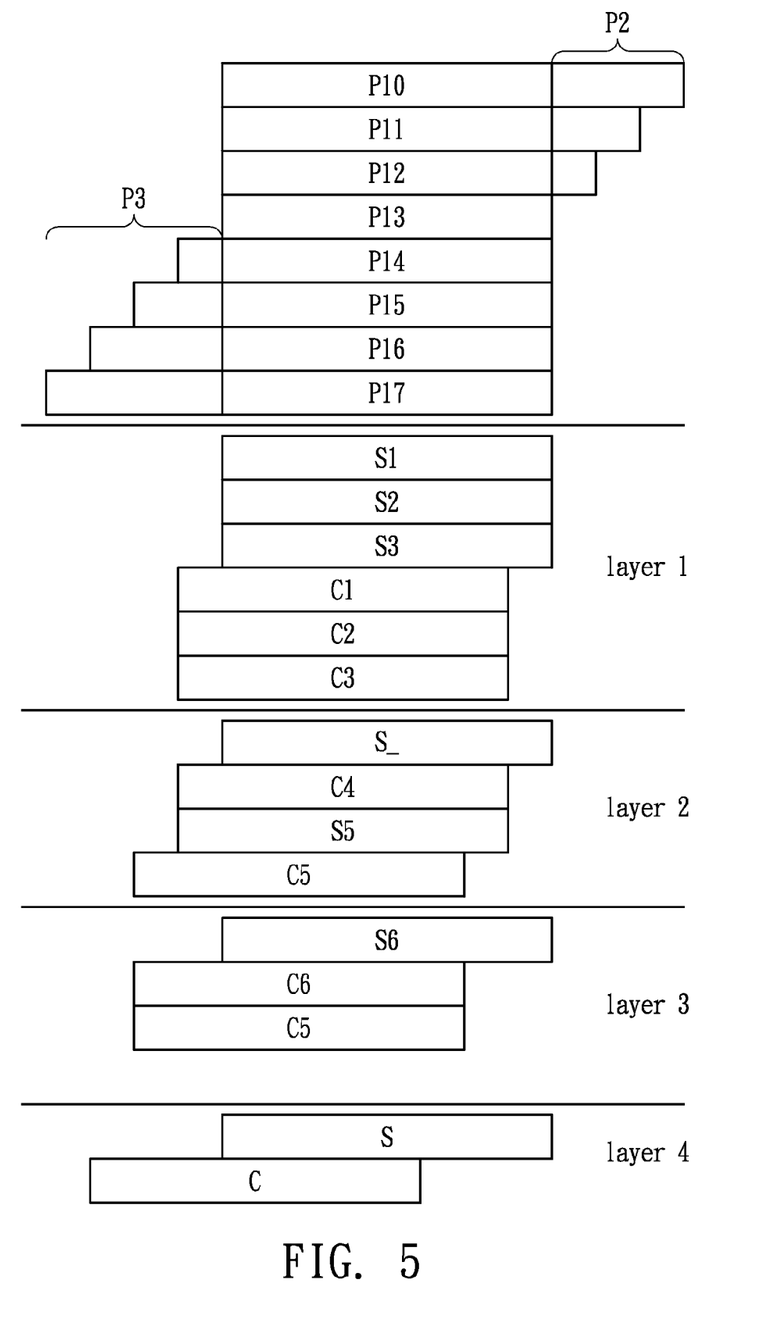
FIG. 5 shows a further description of the operation of the embodiment of the multiplication circuit of the present invention.

FIG. 5 shows a further description of the operation of the embodiment of the multiplication circuit of the present invention. The inputs of the multiplication circuit 400 are the first scalar A, the second scalar B and the matrix M. As shown in FIG. 5, the matrix P1 contains vectors P10 to P17. When the multiplication circuit 400 is in matrix mode, the vectors P10 to P17 can be represented as follows:

P10=$\{m_{00}a_7, m_{10}a_7, m_{20}a_7, m_{30}a_7, m_{40}a_7, m_{50}a_7, m_{60}a_7, m_{70}a_7\}$,

P11=$\{m_{01}a_6, m_{11}a_6, m_{21}a_6, m_{31}a_6, m_{41}a_6, m_{51}a_6, m_{61}a_6, m_{71}a_6\}$,

P12=$\{m_{02}a_5, m_{12}a_5, m_{22}a_5, m_{32}a_5, m_{42}a_5, m_{52}a_5, m_{62}a_5, m_{72}a_5\}$,

P13=$\{m_{03}a_4, m_{13}a_4, m_{23}a_4, m_{33}a_4, m_{43}a_4, m_{53}a_4, m_{63}a_4, m_{73}a_4\}$,

P14=$\{m_{04}a_3, m_{14}a_3, m_{24}a_3, m_{34}a_3, m_{44}a_3, m_{54}a_3, m_{64}a_3, m_{74}a_3\}$,

P15=$\{m_{05}a_2, m_{15}a_2, m_{25}a_2, m_{35}a_2, m_{45}a_2, m_{55}a_2, m_{65}a_2, m_{75}a_2\}$,

P16=$\{m_{06}a_1, m_{16}a_1, m_{26}a_1, m_{36}a_1, m_{46}a_1, m_{56}a_1, m_{66}a_1, m_{76}a_1\}$, and P17=$\{m_{07}a_0, m_{17}a_0, m_{27}a_0, m_{37}a_0, m_{47}a_0, m_{57}a_0, m_{67}a_0, m_{77}a_0\}$.

When the multiplication circuit 400 is in scalar mode, on the other hand, the vectors P10 to P17 can be represented as follows:

P10=$\{0, 0, 0, a_0b_7, a_0b_6, a_0b_5, a_0b_4, a_0b_3\}$,

P11=$\{0, 0, a_1b_7, a_1b_6, a_1b_5, a_1b_4, a_1b_3, a_1b_2\}$,

P12=$\{0, a_2b_7, a_2b_6, a_2b_5, a_2b_4, a_2b_3, a_2b_2, a_2b_1\}$,

P13=$\{a_3b_7, a_3b_6, a_3b_5, a_3b_4, a_3b_3, a_3b_2, a_3b_1, a_3b_0\}$,

P14=$\{a_4b_6, a_4b_5, a_4b_4, a_4b_3, a_4b_2, a_4b_1, a_4b_0\}$,

P15=$\{a_5b_5, a_5b_4, a_5b_3, a_5b_2, a_5b_1, a_5b_0, 0, 0\}$,

P16=$\{a_6b_4, a_6b_3, a_6b_2, a_6b_1, a_6b_0, 0, 0, 0\}$, and

P17=$\{a_7b_3, a_7b_2, a_7b_1, a_7b_0, 0, 0, 0, 0\}$.

P2 contains vectors P21, P22 and P23, which can be represented as follows:

P21=$\{a_0b_2, a_0b_1, a_0b_0\}$, P22=$\{a_1b_1, a_1b_0\}$, and P23=$a_3b_0$. P3 contains vectors P31, P32, P33 and P34, which can be represented as follows: P31=$a_4b_7$, P32=$\{a_5b_7, a_5b_6\}$, P33=$\{a_6b_7, a_6b_6, a_6b_5\}$, and P34=$\{a_7b_7, a_7b_6, a_7b_5, a_7b_4\}$.

The matrix P1 is then summed together by the accumulator 420 as follows:

{C1, S1}=CSA (P10+P11+P12),

{C2, S2}=CSA (P13+P14+P15), and

Figure 6:
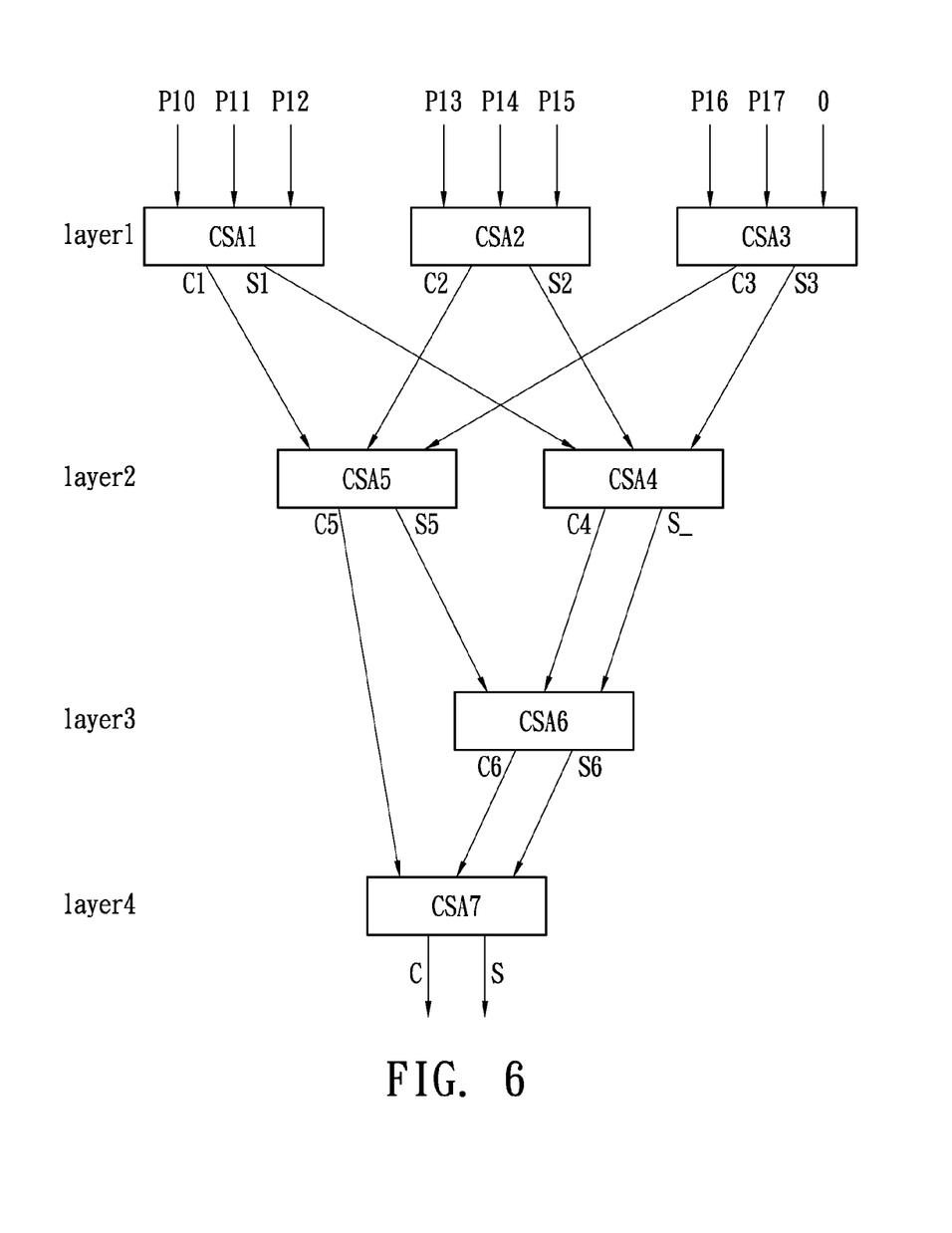
FIG. 6 shows the schematic view of the embodiment of the carry-save type accumulator of the multiplication circuit of the present invention.

{C3, S3}=CSA (P16+P17), wherein CSA denotes the carry-save adder operation, C1 to C3 are carries and S1 to S3 are saves. S1 to S3 are then summed together as follows:

{C4, S_}=CSA (S1+S2+S3). Therefore, S_ equals S1$\oplus$S2$\oplus$S3=PP0 $\oplus$PP1$\oplus$PP2$\oplus$PP3$\oplus$PP4$\oplus$PP5$\oplus$PP6$\oplus$PP7, which is the result requested in matrix mode. When in scalar mode, however, more calculation is needed. C1 to C3 are then summed together as follows:

{C5, S5}=CSA (C1+C2+C3). C4, S5 and S_ are then summed together as follows:

{C6, S6}=CSA (C4+S5+S_). C6, S6 and C5 are then summed together as follows:

{C, S}=CSA (C6+S6+C5). FIG. 6 shows the schematic view of the embodiment of the carry-save type accumulator of the multiplication circuit of the present invention. CSA1 to CSA7 are carry-save adders, which are connected in the manner according to the accumulation process described above, e.g., the operation in layer 1 in FIG. 5 is executed by CSAs in layer 1 in FIG. 6. As shown in FIG. 6, CSA1 gives the carry C1 and save S1, CSA2 gives the carry C2 and save S2, and so on.

Figure 7A:
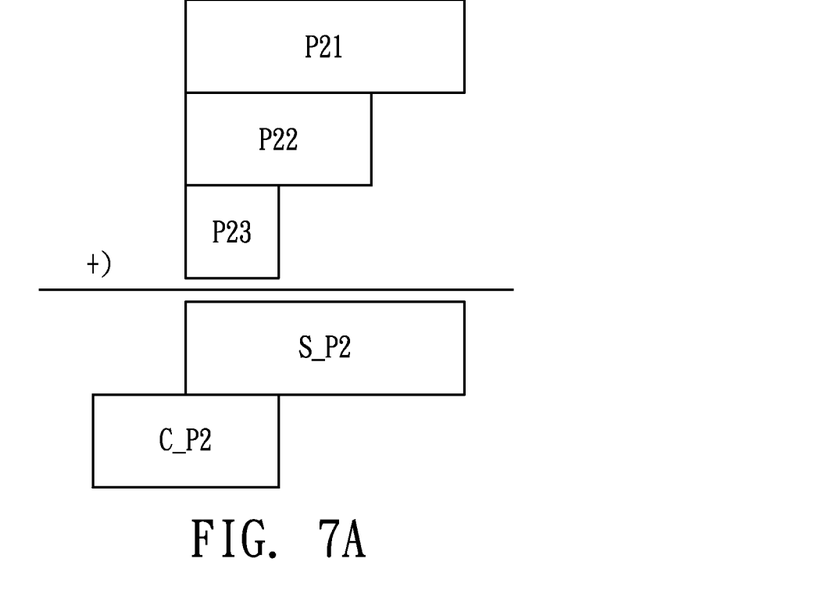
FIG. 7A and 7B show the multiplication operation of the embodiment of the multiplication circuit of the present invention.
Figure 7B:
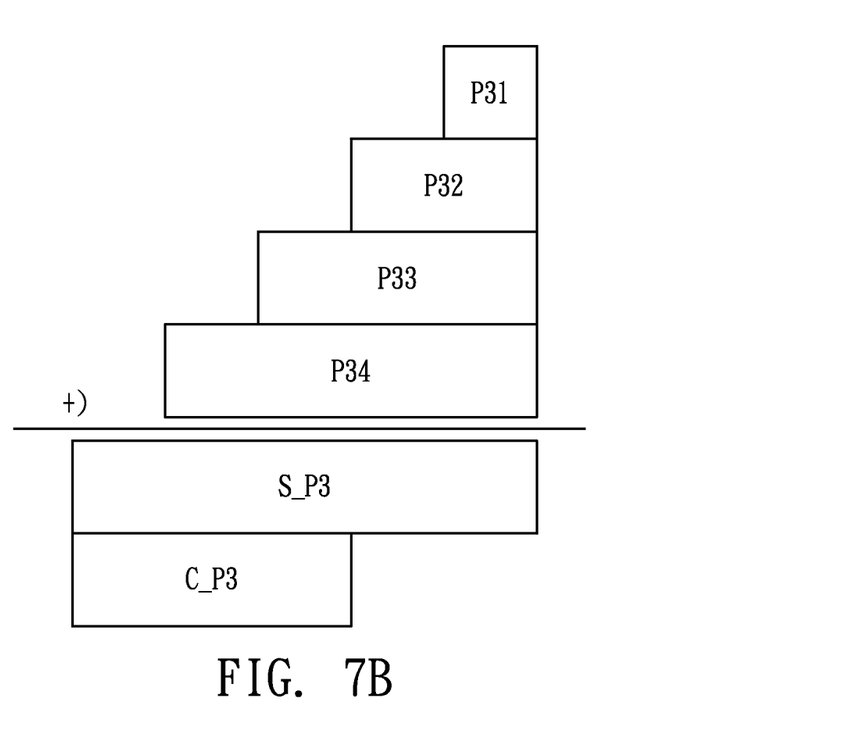
Figure 8:
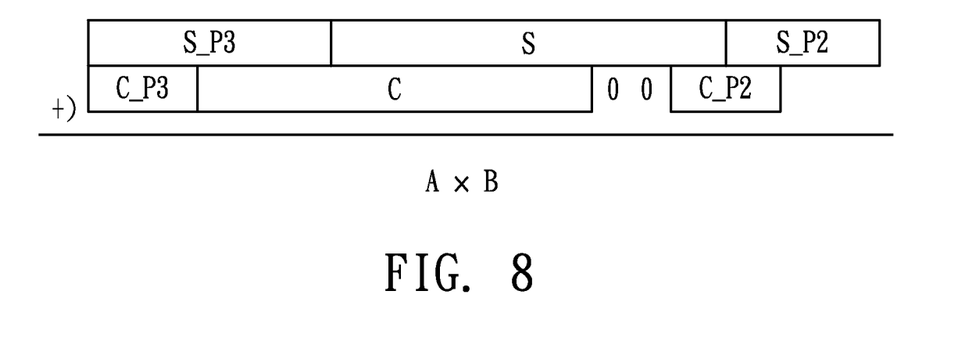
FIG. 8 show the multiplication operation of the embodiment of the multiplication circuit of the present invention.

P2 are summed together to give save S_P2 and carry C_P2, while P3 are summed together to give save S_P3 and carry C_P3, as shown in FIG. 7A and 7B. Finally, C, S C_P2, S_P2, C_P3 and S_P3 are summed together in the adder 130 to give the final result, as shown in FIG. 8.

The embodiment of the multiplication circuit of the present invention shown above is for 8 bits matrix multiplication and 8 bits scalar multiplication. However, the multiplication circuit of the present invention can easily be extended to higher bits multiplication application.

Figure 9:
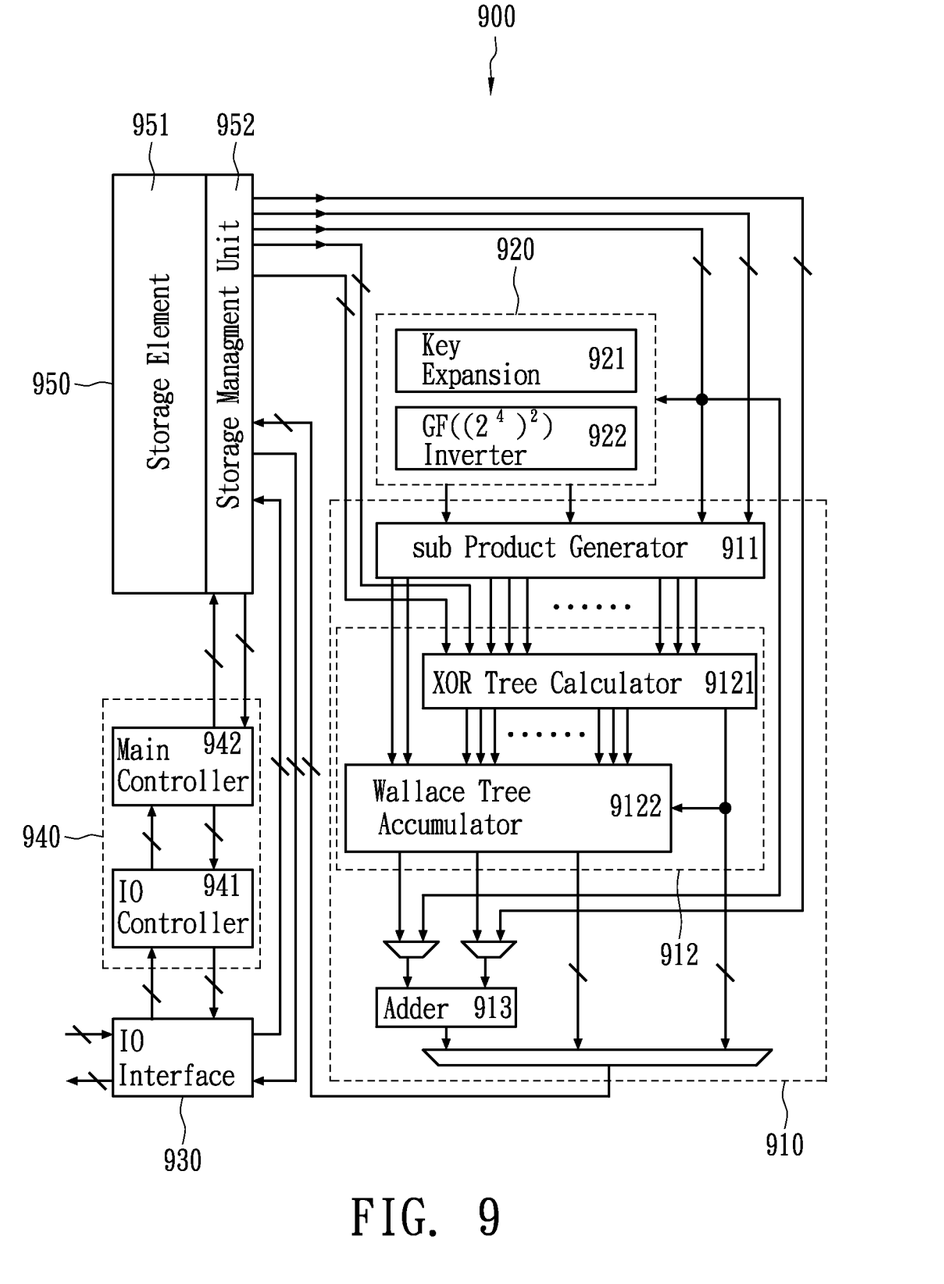
FIG. 9 shows the architecture of one embodiment of the de/encryption circuit of the present invention.

FIG. 9 shows the architecture of one embodiment of the de/encryption circuit of the present invention. The de/encryption circuit 900 comprises the multiplication circuit 910 of the present invention, an arithmetic circuit 920, an input/output (IO) interface circuit 930, a controller circuit 940 and a storage module 950. The multiplication circuit 910 comprises a sub-product generator 911, an accumulator 912, which includes an exclusive-or tree calculator 9121 and a Wallace tree calculator 9122, and an adder 913. The arithmetic circuit 920 comprises a key expansion circuit 921 and Galois-field inverter 922. The controller circuit 940 comprises an IO controller circuit 941 and a main controller 942. The storage module 950 comprises a storage element 951 and a storage management unit 952. The multiplication circuit 910 executes the multiplication operation of the data provided by the arithmetic circuit 920 and the storage module 950 and stores the results in the storage module 950. As shown in FIG. 9, the multiplication circuit 910 provides three kinds of output: a matrix multiplication output with 128 bits, a polynomial multiplication output with 160 bits and a scalar multiplication output with 161 bits. The polynomial multiplication output is obtained by adding S_, S_P2 and S_P3 together. The key expansion circuit 921 generates the round keys for AES algorithm. The Galois-field inverter 922 performs invert operation needed in AES algorithms. In conclusion, the arithmetic circuit 920 performs the calculation other than the matrix multiplication in AES algorithm.

As can be seen in FIG. 9, the multiplication circuit of the present invention integrates the multiplication operation of AES, RSA and ECC algorithms to form a much compact de/encryption circuit. However, the multiplication circuit of the present not only can be used in cryptography, but can also be used in media data processing, digital signal processing and other data processing algorithms.

The above-described embodiments of the present invention are intended to be illustrative only. Those skilled in the art may devise numerous alternative embodiments without departing from the scope of the following claims.

What is claimed is:

1. A multiplication circuit, generating a product of a matrix and a first scalar when in matrix mode and a product of a second scalar and a third scalar when in scalar mode, the multiplication circuit comprising:
    a sub-product generator configured to generate sub-products of the matrix and the first scalar when in matrix mode and sub-products of the second scalar and the third scalar when in scalar mode;
    an accumulator coupled to output of the sub-product generator; and
    an adder configured to sum outputs of the accumulator to generate the product of the second scalar and the third scalar when in scalar mode;
    wherein in matrix mode the sub-products are stacked into a square form and are summed by the accumulator to generate save of the summation of the outputs of the accumulator to be the product of the matrix and the first scalar;
    wherein in scalar mode the sub-products are stacked and each sub-product shifted in position with respect to an adjacent one of the sub-products to make the sub-product to have a stair form, a middle part of the stair form is extracted to form a square matrix, empty fields of the middle part are padded by zeroes, the square matrix is summed by the accumulator to generate save and carry of the summation of the square matrix, and saves and carries of the summation of the remaining parts of the stair form of the sub-products are generated.

2. The multiplication circuit of claim 1, further comprising a storage unit for storing the coefficients of the matrix.

3. The multiplication circuit of claim 2, wherein the storage unit is a ROM.

4. The multiplication circuit of claim 1, wherein the accumulator is a carry-save type accumulator.

5. The multiplication circuit of claim 4, wherein the accumulator is a Wallace-Tree accumulator.

6. The multiplication circuit of claim 1, wherein the second scalar is the third scalar.

7. The multiplication circuit of claim 1, wherein the multiplication circuit supports the cryptographic process of the AES algorithm.

8. The multiplication circuit of claim 1, wherein the multiplication circuit supports the cryptographic process of the ECC algorithm.

9. A de/encryption circuit, comprising:
    an arithmetic circuit, generating round keys for AES algorithm;
    a storage module, providing data to be de/encrypted;
    a multiplication circuit according to claim 1, executing multiplication operation of the round keys and the data respectively provided by the arithmetic circuit and the storage module and storing the results of the multiplication operation in the storage module;
    a controller circuit; and
    an input/output interface circuit, providing data to the storage module.

10. The de/encryption circuit of claim 9, wherein the arithmetic circuit executes an inverse operation in en/decryption process.

* * * * *